United States Patent
Kosche et al.

(10) Patent No.: US 6,718,542 B1
(45) Date of Patent: Apr. 6, 2004

(54) DISAMBIGUATING MEMORY REFERENCES BASED UPON USER-SPECIFIED PROGRAMMING CONSTRAINTS

(75) Inventors: Nicolai Kosche, San Francisco, CA (US); Milton E. Barber, Los Gatos, CA (US); Peter C. Damron, Fremont, CA (US); Douglas Walls, Belmont, CA (US); Sidney J. Hummert, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/549,806

(22) Filed: Apr. 14, 2000

(51) Int. Cl.[7] ................................................. G06F 9/45
(52) U.S. Cl. ..................................................... 717/151
(58) Field of Search ................................ 717/151–161, 717/140–141; 711/100; 709/104

(56) References Cited

U.S. PATENT DOCUMENTS

| | | | | |
|---|---|---|---|---|
| 5,590,329 A | * | 12/1996 | Goodnow et al. | 717/144 |
| 5,897,666 A | * | 4/1999 | Mallick et al. | 711/217 |
| 6,059,839 A | * | 5/2000 | Dehnert et al. | 717/154 |
| 6,272,676 B1 | * | 8/2001 | Haghighat et al. | 717/150 |
| 6,516,463 B2 | * | 2/2003 | Babaian et al. | 717/156 |
| 6,539,541 B1 | * | 3/2003 | Geva | 717/150 |

OTHER PUBLICATIONS

Huang et al. Speculative: Disambiguation: A Compilation Technique for Dynamic Memory Disambiguation. IEEE. 1994. pp. 200–210.*
Davidson et al. Improving Instruction–Level Parallelism by Loop Unrolling and Dynamic Memory Disambiguation. IEEE. 1995. pp. 125–132.*
Lilja et al. Improving Memory Utilization in Cache Coherence Directories. IEEE. 1993. pp. 1130–1146.*
Sato. Speculative Resolution of Ambiguous Memory Aliasing. IEEE. 1998. pp. 17–26.*

* cited by examiner

Primary Examiner—Wei Zhen
(74) Attorney, Agent, or Firm—Park, Vaughan & Fleming LLP

(57) ABSTRACT

A system that allows a programmer to specify a set of constraints that the programmer has adhered to in writing code so that a compiler is able to assume the set of constraints in disambiguating memory references within the code. The system operates by receiving an identifier for a set of constraints on memory references that the programmer has adhered to in writing the code. The system uses the identifier to select a disambiguation technique from a set of disambiguation techniques. Note that each disambiguation technique is associated with a different set of constraints on memory references. The system uses the selected disambiguation technique to identify memory references within the code that can alias with each other.

50 Claims, 4 Drawing Sheets

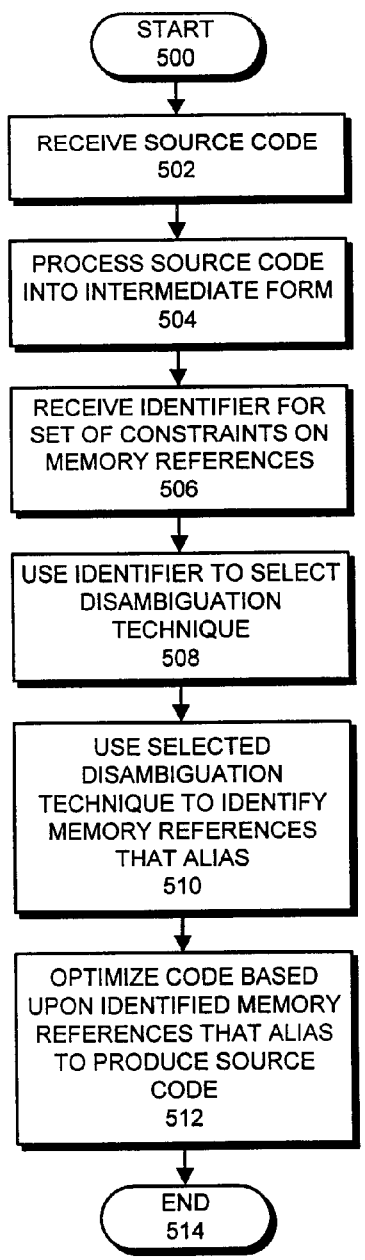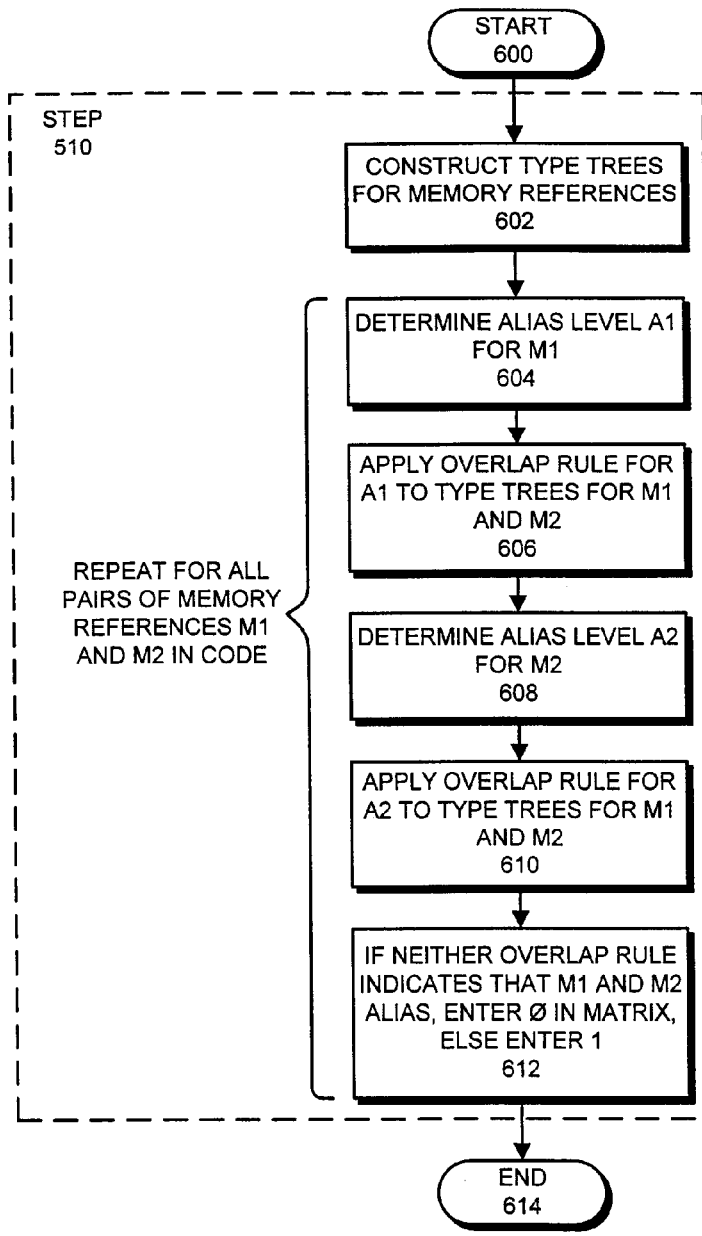
FIG. 5     FIG. 6

DISAMBIGUATING MEMORY REFERENCES BASED UPON USER-SPECIFIED PROGRAMMING CONSTRAINTS

BACKGROUND

1. Field of the Invention

The present invention relates to compilers for computer systems. More particularly, the present invention relates to a method and an apparatus that allows a programmer to specify constraints on memory references that the programmer has followed in writing code so that a compiler is able to more effectively disambiguate memory references in the code.

2. Related Art

Compilers perform many optimizations during the process of translating computer programs from human-readable source code form into machine-readable executable code form. Some of these optimizations improve the performance of a computer program by reorganizing instructions within the computer program so that the instructions execute more efficiently. For example, it is often advantageous to initiate a read operation in advance of where the data returned by the read operation is used in the program so that other instructions can be executed while the read operation is taking place.

Unfortunately, the problem of "aliasing" greatly restricts the freedom of a compiler to reorganize instructions to improve the performance of a computer program. The problem of aliasing arises when two memory references can potentially access the same location in memory. If this is the case, one of the memory references must be completed before the other memory reference takes place in order to ensure that the program executes correctly. For example, an instruction that writes a new value into a memory location cannot be moved so that it occurs before a preceding instruction that reads from the memory location without changing the value that is read from the memory location.

The problem of aliasing is particularly acute for programs that make extensive use of memory references through pointers, because pointers can be easily modified during program execution to point to other memory locations. Hence, an optimizer must typically assume that a pointer can reference any memory location. This assumption greatly limits the performance improvements that can the achieved by a code optimizer.

One solution to this problem is to use a strongly typed computer programming language, such as Pascal, that restricts the way in which pointers can be manipulated. For example, in a strongly typed language, a pointer to a floating point number cannot be modified to point to an integer. Hence, an optimizer is able to assume that pointers to floating pointer numbers cannot be modified to point to integers, and vice versa. The drawback of using strongly typed languages is that strong type restrictions can greatly reduce the freedom of the programmer.

An alternative solution is to construct a code optimizer that detects all of the aliasing conditions that can arise during program execution. Unfortunately, the task of detecting all of the aliasing conditions that can arise is computationally intractable and/or undecidable for all but the most trivial computer programs.

Another solution is to use programming standards. The C programming language standard imposes type-based restrictions on the way pointers may be used in standard-conforming programs. Unfortunately, these programming standards are flagrantly ignored in programs of enormous economic importance, such as major database applications. Consequently, compilers do not use the restrictions imposed by programming standards to achieve better performance.

What is needed is a method and an apparatus that allows a compiler to selectively use restrictions on the way pointers are used in a program to more effectively detect aliasing problems in a computer program. (Note that the process of determining whether two memory references alias is known as alias "disambiguation.")

SUMMARY

One embodiment of the present invention provides system that allows a programmer to specify a set of constraints that the programmer has adhered to in writing code so that a compiler is able to assume the set of constraints in disambiguating memory references within the code. The system operates by receiving an identifier for a set of constraints on memory references that the programmer has adhered to in writing the code. The system uses the identifier to select a disambiguation technique from a set of disambiguation techniques. Note that each disambiguation technique is associated with a different set of constraints on memory references. The system uses the selected disambiguation technique to identify memory references within the code that can alias with each other.

In one embodiment of the present invention, the system initially receives the code in source code form, and processes the code into an intermediate form.

In one embodiment of the present invention, the system optimizes the code based upon the identified memory references to produce executable code.

In one embodiment of the present invention, the system allows the programmer to identify the set of constraints adhered to for each variable in the code.

In one embodiment of the present invention, the disambiguation technique operates by presuming any two memory references alias.

In one embodiment of the present invention, the disambiguation technique operates by presuming that a first memory reference and a second memory reference alias if either reference is to a character type and an originating reference for the character type is a de-reference.

In one embodiment of the present invention, the disambiguation technique operates by presuming any two memory references alias unless they are both one of, a basic type, an enumerated type and a pointer type.

In one embodiment of the present invention, the disambiguation technique operates by presuming that a first memory reference and a second memory reference alias if there is an overlapping match between common initial portions of a first type tree for the first memory reference and a second type tree for the second memory reference.

In one embodiment of the present invention, the disambiguation technique operates by presuming that a first memory reference and a second memory reference alias if there is an overlapping match between a first type tree for the first memory reference and a second type tree for the second memory reference. In a variation on this embodiment, a root node of the first type tree corresponds to a root node of the second type tree within the overlapping match.

In one embodiment of the present invention, determining if there is an overlapping match involves ensuring that for marked nodes in a type tree that are descendants of a union field, corresponding nodes for associated union fields are marked. In a variation on this embodiment, the corresponding nodes for associated union fields are determined by considering a common initial portion of the union field with respect to other union fields.

In one embodiment of the present invention, the system indicates an error condition if pointers of different structure types are cast to each other.

In one embodiment of the present invention, the disambiguation technique operates by presuming that a first memory and a second memory reference alias if: the first memory reference is directed to a structure element of the same basic type as the second memory reference; and the first memory reference and the second memory reference have the same structure offset.

In one embodiment of the present invention, the disambiguation technique operates by presuming that a first memory and a second memory reference having the same structure offset alias only if explicit program instructions specify that the first memory reference and the second memory reference alias.

In one embodiment of the present invention, the disambiguation technique operates by presuming that a first memory into a first structure and a second memory reference into a second structure alias if: the first structure and the second structure include the same basic types in the same order; and the first memory reference and the second memory reference have the same structure offset.

In one embodiment of the present invention, the disambiguation technique operates by presuming that a first memory and a second memory reference alias if the first memory reference and the second memory reference have the same structure offset.

In one embodiment of the present invention, the disambiguation technique operates by using a tree-based matching scheme for alias analysis.

In one embodiment of the present invention, the disambiguation technique operates by using a de-referenced type and an accessed type in a type-based alias analysis.

In one embodiment of the present invention, if a first memory reference is associated with a first disambiguation technique and a second memory reference is associated with a second disambiguation technique, the system uses both the first disambiguation technique and the second disambiguation technique to determine whether the first memory reference and the second memory reference alias.

Hence, the present invention provides the user with a mechanism to express type-based information about the way pointers are used in a program. This information allows a compiler to do a significantly better job of alias disambiguation for pointer-based memory references in the program.

One embodiment of the present invention provides a plurality of alias levels, wherein each level specifies a certain set of properties about the way pointers are used in a program. These levels vary in "strength." "Weaker" levels give the programmer more freedom, but result in lower run-time performance under optimization. "Stronger" levels give the programmer less freedom, but result in higher run-time performance under optimization.

BRIEF DESCRIPTION OF THE FIGURES

FIG. 5 is a flow chart illustrating the process of compiling a source code program in accordance with an embodiment of the present invention.

FIG. 6 is a flow chart illustrating the process of identifying memory references that can alias in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Computer System

Figure 1:
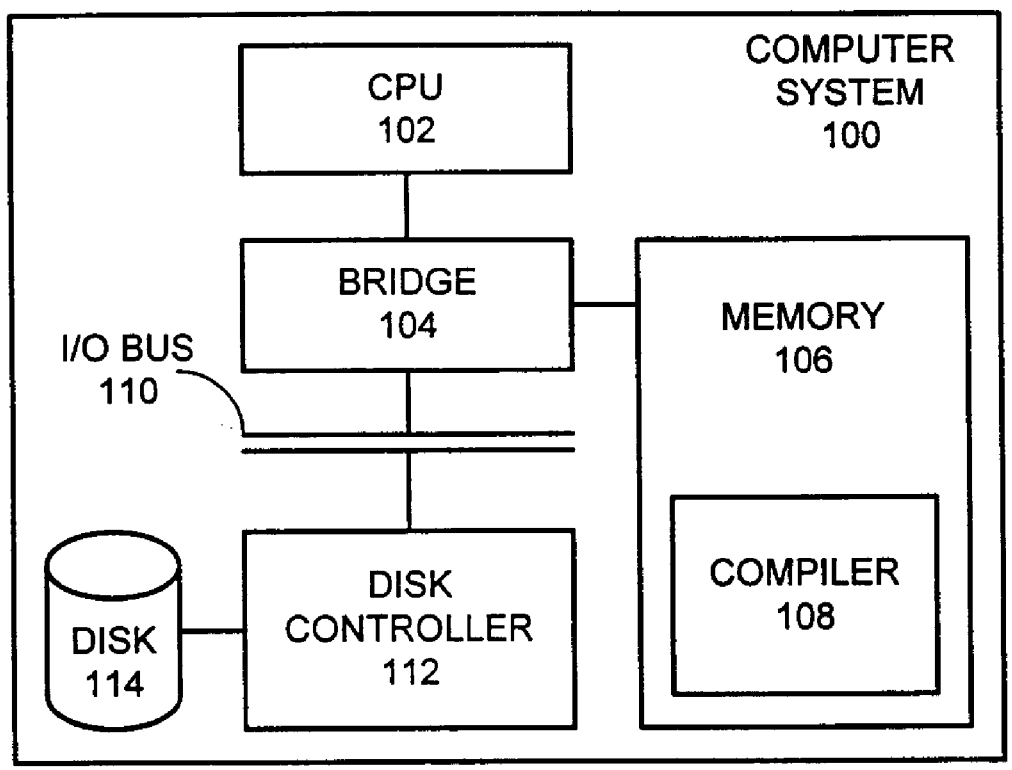
FIG. 1 illustrates a computer system in accordance with an embodiment of the present invention.

FIG. 1 illustrates a computer system 100 in accordance with an embodiment of the present invention. Computer system 100 includes central processing unit (CPU) 102, bridge 104, memory 106, disk controller 112 and disk 114. CPU 102 can include any type of computational circuitry, including, but not limited to, a microprocessor, a mainframe computer, a digital signal processor, a personal organizer, a device controller and a computational device within an appliance.

CPU 102 is coupled to memory 106 through bridge 104. Bridge 104 can include any type of circuitry for coupling CPU 102 with other components in computer system 100. Memory 106 can include any type of random access memory that can be used to store code and data for CPU 102.

CPU 102 is coupled to disk 114 through disk controller 112, bridge 104 and I/O bus 110. I/O bus 110 can include any type of communication channel for coupling I/O devices with computer system 100. Disk controller 112 can include any type of circuitry for controlling the actions of storage devices, such as disk 114. Disk 114 can include any type of non-volatile storage for computer system 100. This includes, but is not limited to, magnetic storage, flash memory, ROM, EPROM, EEPROM, and battery-backed-up RAM.

Memory 106 contains code that implements compiler 108. Compiler 108 converts a program in human-readable source code form into machine-readable executable code form for execution on CPU 102.

Figure 2:
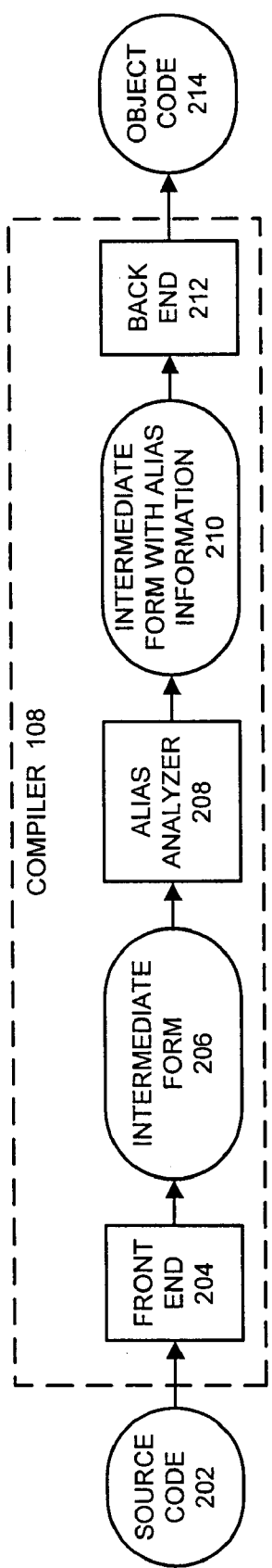
FIG. 2 illustrates a compiler in accordance with an embodiment of the present invention.

Note that the present invention can generally be used within any type of computing system, and is not limited to the computing system illustrated in FIG. 2.

Compiler

FIG. 2 illustrates compiler 108 in accordance with an embodiment of the present invention. Compiler 108 includes front end 204, alias analyzer 208 and back end 212. Front end 204 parses source code 202 into intermediate form 206. Alias analyzer 208 disambiguates memory references within intermediate form 206 to produce alias information. This alias information is combined with intermediate form 206 and is fed into back end 212. Back end 212 generates object code 214, which is suitable for execution by CPU 102.

Note that back end 212 performs code optimizations that reorganize instructions within object code 214 so that object code 214 operates more efficiently. This reorganization is subject to the aliasing constraints determined by alias analyzer 208.

Alias Matrix

Figure 3:
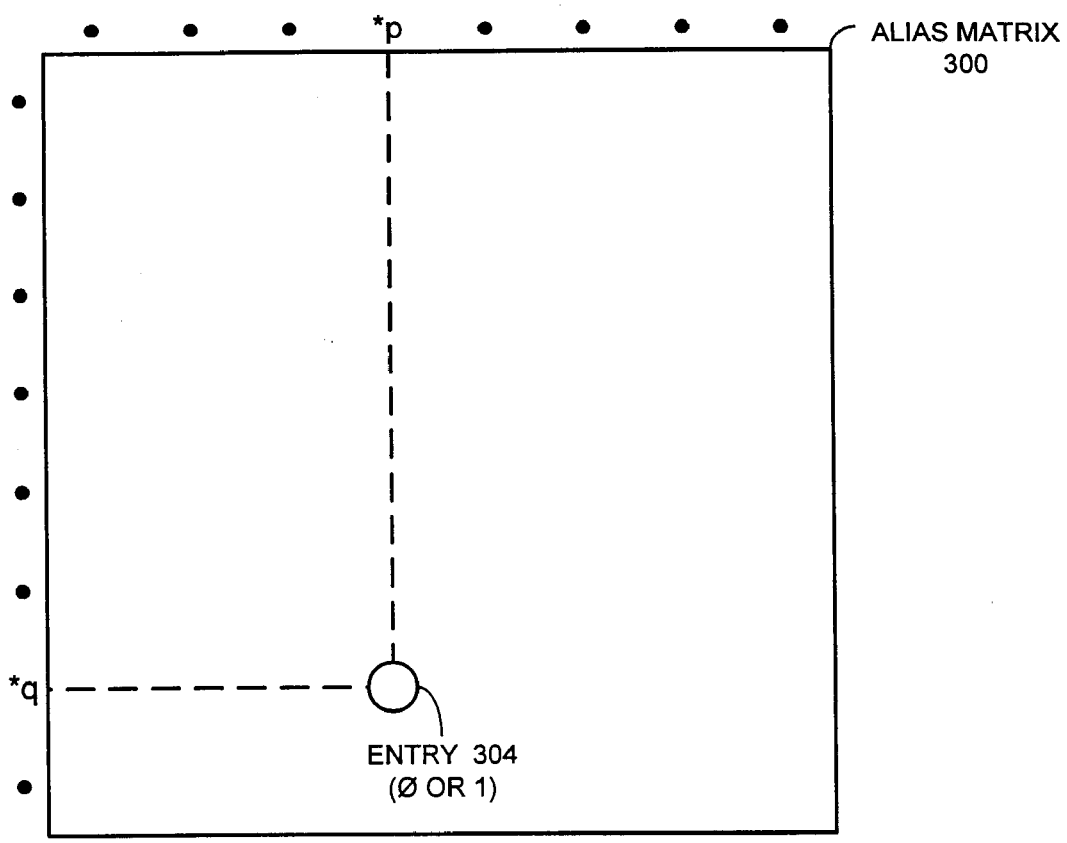
FIG. 3 illustrates an alias matrix in accordance with an embodiment of the present invention.

FIG. 3 illustrates alias matrix 300 in accordance with an embodiment of the present invention. During the process of analyzing intermediate form 206, alias analyzer 208 constructs alias matrix 300. Alias matrix 300 includes a row and a column for each memory reference within intermediate form 206. The intersection of each row and column contains a zero value or a one value indicating whether or not the corresponding memory references alias with each other. For example, alias matrix 300 contains entry 304, which holds a value indicating whether memory reference *p aliases with memory reference *q.

Note that the alias matrix 300 depicted in FIG. 3 is a conceptual representation only. In practice, alias matrix 300 is simply too large to construct. Hence, the system actually references a representation of a subset of relevant information from alias matrix 300. Because of the symmetric structure of alias matrix 300, half of alias matrix 300 contains redundant information. Hence, only half of alias matrix 300 needs to be represented. Furthermore, various schemes can be used to eliminate the need to represent many of the entries within alias matrix 300. Also note that alias matrix 300 can be stored as a sparse matrix representation.

Type Tree

Figure 4:
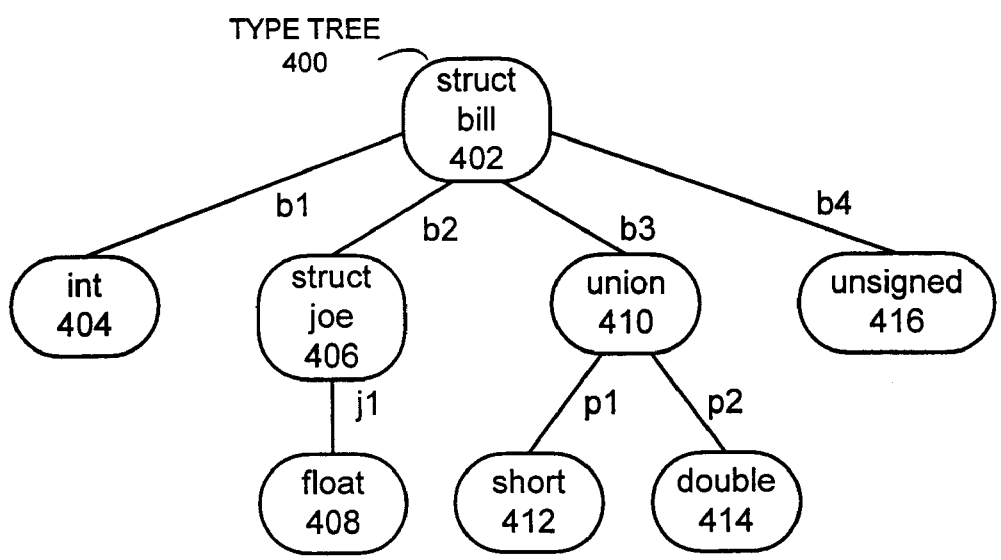
FIG. 4 illustrates a type tree in accordance with an embodiment of the present invention.

FIG. 4 illustrates type tree 400 for the type of a data structure in accordance with an embodiment of the present invention. Type tree 400 represents a data structure defined in the C programming language as follows:

```
struct joe {floatj1};
typedef union {short p1, double p2} pete;
struct bill {int b1, struct joe b2, pete b3, unsigned b4};
```

Process of Compilation

FIG. 5 is a flow chart illustrating the process of compiling a source code program in accordance with an embodiment of the present invention. The system starts by receiving source code 202 (step 502) (see FIG. 2). This source code is processed into intermediate form by front end 204 (step 504). The system also receives an identifier for a set of constraints on memory references that the programmer has adhered to (step 506). This identifier can be received as a command line argument during the compilation process, or can be received through explicit commands (or pragmas) within the code. These command line arguments and pragmas are described in more detail below. The identifier is used to select a disambiguation technique (step 508), and this disambiguation technique is used to identify memory references that alias within the program (step 510). Next, back end 212 optimizes the code using the aliasing information to produce object code 214 (step 512).

Process of Determining Aliasing Relationships

FIG. 6 is a flow chart illustrating the process of identifying memory references that can alias in accordance with an embodiment of the present invention. FIG. 6 illustrates in more detail the operations involved in performing step 510 from FIG. 5. The system first constructs type trees for the memory references (step 602), such as the type tree illustrated in FIG. 4.

Next, for all memory references M1 and M2 in the code, the system performs a number of actions. The system determines the alias level "A1" for memory reference M1 (step 604) and then applies the overlap rule for A1 to the type trees for M1 and M2 (step 606). The system also determines the alias level "A2" for memory reference M2 (step 608) and applies the overlap rule for A2 to the type trees for M1 and M2 (step 610). If neither of these overlap rules indicate that M1 and M2 alias, the system enters a zero in the corresponding entry of alias matrix 300. Otherwise, the system enters a one in the entry (step 612).

DISAMBIGUATION IN MORE DETAIL

The following section describes a specific implementation of the present invention in more detail. Although this implementation and examples presented in this section focus on the C programming language, the present invention can generally be applied to any programming language for which aliasing problems exist.

Alias Levels

Alias levels specify assumptions the compiler may make about the aliasing relationships of memory references. These assumptions in turn have the effect of controlling the way in which pointer values may be dereferenced in the program.

The following terms are used in discussing alias levels:

Memory Reference

An expression that causes a read and/or a write access to an object in memory. Any suffixed "." (dot) operators or subscript operators that restrict the extent of the object being accessed are considered to be part of the memory reference. For the purpose of this definition:

A constant is not considered to be in memory.

A use of the "&" (address of) operator is not considered to be a memory reference.

Any use of the "register" qualification is ignored (i.e. a register-qualified object is still considered to be in memory).

EXAMPLE 1

In the program fragment "a=b[c+3]+d.e;", there are four memory references, i.e. "c", "b[ ]", "d.e", and "a". (Note that although these examples use the "C" programming language, analogous examples can be constructed for other programming languages.)

EXAMPLE 2

In the program fragment "p->a.b[*c].d", there are four memory references, i.e., "c", "*c", "p" and "p->a.b[ ].d".

EXAMPLE 3

In the program fragment "**a+1" there are three memory references, i.e. "a", "*a" and "**a".

EXAMPLE 4

In the program fragment "*&a", there is one memory reference, i.e. "*&a", and this reference has the same effect as the simple reference "a".

EXAMPLE 5

In the program fragment "++i", there is one memory reference, "i".

EXAMPLE 6

In the program fragment:
struct foo {float fld1, int fld2} func(int *arg);
a=func(&b).fld2;
there is one memory reference, "a".

Dereference

A dereference is a memory reference that explicitly uses a pointer value to access an object in memory. More specifically, a use of the "*" unary operator, a use of the "->" postfix operator, or a use of the "[ ]" (subscript) postfix operator when the expression being subscripted has a pointer type as written.

Direct Memory Reference

A memory reference that is not a dereference.

Basic Type

One of the following 14 types (the type names in parentheses specify equivalent syntax for declaring the same basic type):

char
signed char
unsigned char
short (signed short, short int, signed short int)
unsigned short (unsigned short int)
int (signed, signed int)
unsigned (unsigned int)
long (signed long, long int, signed long int)
unsigned long (unsigned long int)
long long (signed long long, long long int, signed long long int)
unsigned long long (unsigned long long int)
float
double
long double Alias Relation, May Alias, Do Not Alias The alias relation is a relation between pairs of memory references in a program. We say that two memory references may alias if the relation holds between them, and we say that two memory references do not alias when the relation does not hold between them.

The alias relation holds between a pair of memory references if it is possible that during some single execution of the program, some particular bit in memory is accessed by both of the references. Similarly, the relation does not hold between a pair of memory references if it is impossible for there to be a particular bit in memory which is accessed by both of the references during a single execution of the program. (For the purpose of this definition, it should be assumed that each heap allocation call and stack extension allocates a distinct memory area.)

The alias relation is determined by the level of knowledge and analysis that goes into its computation. The relation is ultimately undecidable, but if the level of knowledge and analysis applied in some specific case is sufficient to prove that it is impossible for there to be a particular bit in memory which is accessed by both of the references during a single execution of the program, then we may say the relation does not hold. Otherwise, we say it holds. Thus, the alias relation can be thought of as meaning "may possibly alias given current knowledge," or equivalently, "unable to prove they do not alias given current knowledge."

As a simple example, if there are two static variables named "a" and "b" in a program, it is clear that references to these two variables do not alias. On the other hand, if there is a pointer variable named "p" in the program, it is not so clear whether the dereference "*p" may alias with either "a" or "b". Lacking other information, we say they may alias. If we have the additional knowledge that the address of "a" is never taken, we can say that "a" and "*p" do not alias.

One embodiment of the present invention uses flags and pragmas to enable the compiler to assume, without further knowledge or analysis, that certain dereferences do not alias based on the types of these dereferences.

Referenced Type

For a direct memory reference:

If the dominant operator of the expression is "." (dot), then the referenced type of the memory reference is the (struct or union) type of the left operand.

If the dominant operator of the expression is "[ ]" (subscript), then the referenced type of the memory reference is the (array) type being subscripted in the expression as written.

Otherwise, the referenced type of the memory reference is the type of the expression.

For a dereference, if the type of the pointer being dereferenced is "pointer-to-x", then the referenced type of the memory reference is "x".

Accessed Type

The accessed type of a memory reference is the type of the expression. Notice that the accessed type of a memory reference is always contained within (including the case of "the same as") the referenced type.

EXAMPLE 7

In the following program fragment, there are three dereferences of the pointer variable "p". The referenced type and the accessed type of each reference are as shown.

| program fragment | referenced type | accessed type |
| --- | --- | --- |
| struct foo {float fld1} *p; | | |
| s = *p; | struct foo | struct foo |
| e = p[3]; | struct foo | struct foo |
| f = p->fld1; | struct foo | float |

EXAMPLE 8

Consider the following program fragment:
struct bar{int *fld2};
struct goo{struct bar *fld1};
struct goo *q;
x=*(q->fld1->fld2);

There are three dereferences in this fragment. The dereferences and the respective referenced types and accessed type are as follows:

| dereference | referenced type | accessed type |
| --- | --- | --- |
| q->fld1 | struct goo | struct bar* |
| q->fld1->fld2 | struct bar | int* |
| *(q->fld1->fld2) | int | int |

Tree Terminology

This document uses a tree representation in its definitions of the alias levels. For trees, it is assumed that the terms node, arc, root node, and leaf node are understood. The term child node (meaning immediate child node), is used in a non-reflexive sense (a node is not a child of itself), while the terms descendant and ancestor are used in a reflexive sense (a node is a descendant and an ancestor of itself). Also, in the trees used here, the children of a node possess a linear ordering.

Type Trees

Trees constructed to represent a C type are termed type trees. These trees have two important properties:

The trees are "fully populated" i.e. filled out down to basic types, pointer types, or enum types as leaf nodes.

The trees depend on the type itself, not on the pattern of declarations used to declare the type.

(Such a tree representation can only be constructed for a complete type, so when an incomplete type is involved in a memory reference, it is the complete form of the type that is used to determine the effect of the alias levels.)

Each node in the tree corresponds to a type, so the field names and the bit field widths are placed into the tree as labels on the arcs.

The tree for a type is constructed as follows:

Type qualification is ignored in constructing the tree.

If the type is a basic type, a node carrying the basic type is constructed (i.e. the type declarations that are alternate, equivalent syntax for the same basic type result in the same node). The constructed node is a leaf node, with no children.

If the type is a struct or a union, a node carrying "struct" or "union" respectively and the tag name (if any) is constructed. Trees for the type of each field, taken in declaration order, are attached as children of the node. The field names, if any, are attached as labels on the arcs. For fields that are bit fields, the bit field widths are also attached as labels on the arcs.

If the type is an enum type, a node carrying "enum", the enum tag name (if any), and a set of name-value pairs (for the enum members) is constructed. (Notice that the enum members are carried as a set, so that two enum types that differ only in the order of declaration of the enum members, but that have the same resultant set of name-value pairs, result in the same node). The constructed node is a leaf node, with no children.

If the type is an array type, a node carrying "array" and the dimension size is constructed. A tree for the array element type is attached as the single child of the node.

If the type is a pointer type, a node carrying "pointer" and a designator of the tree for the pointed-to type is constructed. (If the pointed-to type is void, the node carries no designator.) The constructed node is a leaf node, with no children, however the tree for the pointed-to type must be constructed, so it can be designated by this node.

In the following diagrams, indentation is used to show examples of trees (i.e. Cambridge notation). Labels on arcs are represented as colon-delimited labels on the child node.

EXAMPLE 9

Consider the program fragment:

struct joe {floatj1};
typedef union {short p1, double p2} pete;
struct bill {int b1, struct joe b2, pete b3, unsigned b4};

The tree for type struct bill looks like this:

```
struct, tag=bill
    b1: int
    b2: struct, tag=joe
        j1: float
    b3: union
        p1: short
        p2: double
    b4: unsigned
```

Notice that the typedef name (pete) is not a part of the tree.

EXAMPLE 10

Consider the program fragment:

typedef enum {blue, red=3, green} lucille;
typedef struct bessie {short abagail:10, lucille adelia[10]} orpha;
static orpha grandma[20];

The tree for the type of variable grandma looks like this:

```
array, size=20
    struct, tag=bessie
        abagail: 10: short
        adelia: array, size=10
            enum, {blue:1, red:3, green:4}
```

Notice that the undeclared values for "blue" and "green" are supplied in the node. (The braces shown enclosing the members are not the braces of C syntax, but denote that the fact the name-value pairs are carried in the node as a set.)

An additional feature of type trees is the ability for each node to carry a special mark. In examples, we use boldface to show marked nodes.

EXAMPLE 11

Here are three differently marked versions of the tree for struct bill from Example 9 above:

```
struct, tag=bill          struct, tag=bill          struct, tag=bill
    b1: int                   b1: int                   b1: int
    b2: struct, tag=joe       b2: struct, tag=joe       b2: struct, tag=joe
        j1: float                 j1: float                 j1: float
    b3: union                 b3: union                 b3: union
        p1: short                 p1: short                 p1: short
        p2: double                p2: double                p2: double
    b4: unsigned              b4: unsigned              b4: unsigned
```

In the left example, the int type, that is the type of the first field of struct bill, carries the mark. In the middle example, the union type, that is the type of the third field of struct bill, carries the mark. In the right example, the unsigned type, that is the type of the fourth field of struct bill, carries the mark.

Subtree

The subtrees of a given type tree are:

the given tree, if it is a struct or union type, each of the field types, if it is an array type, the element type, and the subtrees of any such field or element types.

Note that when we speak of a subtree of a given tree, we mean not only the subtree regarded as a tree, but the position of that subtree within the given tree.

Thus, for example, if we have the following type tree:

```
struct
    f1: int
    f2: float
    f3: int
``` then it is meaningful to speak of "that subtree which is the first field type" as something distinct from "that subtree which is the third field type," even though these two subtrees are identical when regarded as trees. In addition, note that the term "subtree" is used in a reflexive sense.

Referenced Tree

The referenced tree of a memory reference is the tree for the referenced type, with all of the nodes of the accessed type carrying the mark. Note that the referenced tree of a memory reference is to record what is known about the context of the accessed type of the reference.

EXAMPLE 12

Consider the type struct bill from Example 9 above, and assume the declaration struct bill *billp;. In this case, the three dereferences billp->b1, billp->b3, and billp->b4 have as respective referenced trees the three trees shown above in Example 11. In addition, the referenced tree for the dereference *billp is:

```
struct, tag=bill
    b1: int
    b2: struct, tag=joe
        j1: float
    b3: union
        p1: short
        p2: double
    b4: unsigned
```

EXAMPLE 13

Consider the following declaration:

```
struct bits {
    int b1:10;
    short b2:7;
} *bp;
```

The referenced tree for the dereference bp->b2 is:

```
struct, tag=bits
    7: short
```

Notice that for any reference to a struct or union field, the referenced tree is always at least two nodes.

Forced Match

A forced match is a symmetric relation between pairs of types. For example, we say two types have a forced match if the relation holds between them. (Notice that the relation is symmetric, so the ordering of the types in the pairs is irrelevant.)

The non-basic types in the pairs each have an associated scope, so, for example, a type struct joe in one scope is regarded as a distinct type from an otherwise identical type struct joe defined in another scope.

This relation is used in the match algorithms (see below). Initially, the relation holds the following pairs:

(char, signed char), (char unsigned char), (signed char, unsigned char)

(short, unsigned short)

(int, unsigned int)

(long, unsigned long)

(long long, unsigned long long)

The type version of the "alias" pragma adds pairs to this relation, while the type version of the "noalias" pragma may delete pairs from this relation.

Forced Non-match

A forced non-match is a symmetric relation between pairs of types. For example, we say two types have a forced non-match if the relation holds between them. (Notice that the relation is symmetric, so the ordering of the types in the pairs is irrelevant.)

The non-basic types in the pairs each have an associated scope, so, for example, a type struct joe in one scope is regarded as a distinct type from an otherwise identical type struct joe defined in another scope.

This relation is used in the match algorithms (see below). Initially, the relation is empty. The type version of the "noalias" pragma adds pairs to this relation.

It is an error for a specific pair of types to be placed into both the forced match and forced non-match relations.

Match

Six of the seven alias levels in this embodiment of the present invention employ a match algorithm as the basis of their semantics. These match algorithms are named for their corresponding alias levels, i.e. basic match, weak match, layout match, strict match, std match, and strong match, respectively. The unqualified term "match" is used when it is clear from context which of the match algorithms is intended.

Each of the match algorithmstakes two type trees and answers the question "Do the two trees have a match?"

The algorithms work by attempting to construct a set of correspondences from the nodes and arcs of one tree to the nodes and arcs of the other tree according to a list of correspondence rules that comprise the particular match algorithm. Each of the individual correspondence rules in the list are judged to succeed if their requirements for constructing a correspondence are satisfied, and to fail otherwise. However, some of the correspondence rules are recursive, i.e. a part of the requirement for constructing a correspondence at a specific point is to also be able to construct a correspondence for nodes or arcs descendant from that point, possibly employing any of the correspondence rules in the list for that same match algorithm. If it is possible to find at least one node from each tree such that the match algorithm can successfully construct a correspondence between those two nodes, then the two trees are judged to have a match, otherwise they are judged to not have a match. When two trees are judged to have a match, the set of constructed correspondences is a part of the output of the algorithm. However, since there may be more than one point at which the algorithm succeeds, this set of constructed correspondences is not necessarily unique.

(Note: the match algorithms for the stronger alias levels take more information from the type tree into account in establishing a correspondence, while the match algorithms for the weaker alias levels take less information from the type tree into account, and thus are more likely to judge that the two trees do have a match.)

Strong Match

The correspondence rules for the strong match algorithm are as follows:

It is not possible to construct a correspondence between two nodes that are the root nodes of trees that have a forced non-match.

Two nodes correspond if they are the root nodes of trees that have a forced match.

Two nodes correspond when all of the following are true:
  The information they carry, exclusive of the mark, is identical. For pointer nodes, two nodes are considered to carry identical information if they both do not carry a designator of a pointed-to type tree or if they both carry designators of trees that have a strong match.
  They have the same number of children.
  For union nodes, all of the arcs to their children correspond respectively when taken in some order.
  For non-union nodes, all of the arcs to their children (if any) correspond respectively when taken in the same order.

Two arcs correspond only when the information they carry as labels is identical and their child nodes correspond.

std Match

The std match algorithm is the same as the strong match algorithm above.

Layout Match

The layout match algorithm is the same as the strong match algorithm, with the following changes:

For struct and union types, ignore the tag name and the field names when determining correspondence.

For two union nodes, the nodes can also correspond if it is true that there is a correspondence between each union field and at least one of the fields of the other union. Notice that this implies there is no requirement that the number of fields be the same.

A union node can also correspond with any other node that has the property that it has a correspondence with all of the union fields.

An array node with a dimension size can also correspond with a struct node having a number of fields equal to the dimension size if there is a correspondence between the array element node and all of the field nodes.

An enum node is treated as if it were an "int" node when determining correspondence.

Two pointer types always correspond.

Strict Match

The strict match algorithm is the same as the layout match algorithm, with the following addition:

Two struct types correspond (with no requirements placed on the children) if there is a union type such that both of the struct types are union fields, and this union type is visible at the point of either memory reference.

Weak Match

The weak match algorithm is the same as the strong match algorithm, with the following changes:

Any struct or union node corresponds with any struct orunion node (with no requirements placed on the children).

For array nodes, ignore array dimension sizes when determining correspondence.

An enum node is treated as if it were an "int" node when determining correspondence.

Two pointer types always correspond.

Basic Match

The basic match algorithm is the same as the strong match algorithm, with the following changes:

A struct or union node with one child matches with any other struct or union node with one child if the children match and the bit field widths match.

An enum node is treated as if it were an "int" node when determining correspondence.

Two pointer types always correspond.

Note that this match algorithm is applied only to limited cases, so it does not need many new correspondence rules.

Overlapping Match

Two type trees are said to have an overlapping match if there is a match between them with the property that for at least one pair of corresponding nodes, both nodes are the ancestor of a marked node. Note that the term "overlapping match" is used only in contexts where is it clear which match algorithm is intended.

EXAMPLE 14

Consider the following type tree:

```
struct
    a: int
    b: struct
        c: float
    d: union
        e: struct
            f: short
            g: double
        h: long
```

Four examples of trees that have an overlapping match with this tree when strong matching is used are:

```
union              union
    e: struct          e: struct      struct         struct
        f: short           f: short       f: short       f: short
        g: double          g: double      g: double      g: double
    h: long            h: long
```

Also, the referenced types short and double would have an overlapping match.

Alternatively, none of the following trees have an overlapping match with the example tree when using strong matching:

```
struct          struct         float      union
    f: short        f: short                   e: struct
    x: double                                      f: short
```

-continued

```
                              g: double
                    h: long
```

Under layout matching, the field names are ignored, and so the first example above would have an overlapping match. Under weak matching, all structs match, and so both the first and second examples above would have an overlapping match.

Note that the purpose of this definition is to give precise meaning to the informal notion of "considering context and some particular matching rules, a memory reference potentially references an overlapping portion of what another memory reference references".

Also note that most of the time, when there is an overlapping match between two trees, there will be a direct correspondence between two marked nodes. The "ancestor" part of the above definition is needed for a few cases where non-scalar nodes are considered to correspond without any correspondence being constructed for their descendants (e.g. the fact that any two structs correspond under weak matching).

Initial Portion, Length of an Initial Portion

An initial portion of a type tree is one or more of the subtrees of the tree, constructed as follows:

For a basic type, pointer type, or enum type, the initial portion of the type tree is just the given tree.

For a struct type, any contiguous run of the structs field types that includes the first field type is considered to be an initial portion.

For a union type, the initial portion (if any) is the common initial portion (see below) of the first union field type taken with respect to the list of all of the union field types.

For other types, there is no initial portion.

The length of an initial portion is the number of subtrees in it.

Common Initial Portion

The common initial portion of a type tree with respect to a list of type trees of which it is a member is the longest initial portion of the type tree with the property that every other member of the list has an initial portion at least as long and the corresponding members of each of the initial portions all have a match with each other.

EXAMPLE 15

Consider the following list of three type trees. Assuming the initial state of the forced match and forced non-match relations, and strong matching, then the common initial portion of each of the type trees with respect to the whole list is the subtrees whose root nodes are shown underlined.

```
struct              union              struct
    f1: int             u1: struct         f1: unsigned
    f2: float               f1: int            fx: float
    f3: long                f2: float          fy: long
                            f3: long
                        u2: struct
                            f1: int
                            f2: float
                            f3: int
```

For this example, the float fields are not a part of the common initial portion because strong matching was used, and the float field has a non-matching field name in the third type tree. If we switched to layout matching, then the float field would be a part of the common initial portion. In addition, if the alias pragma was used to add the (int, long) pair to the forced match relation, then the third field would also be a part of the common initial portion.

Applied Alias Level

The alias_level flag and the alias_level pragma combine to associate with every memory reference in the program one of the seven available alias levels (see Section 2 below for the details). The alias level thusly associated with a memory reference is termed the applied alias level of the reference.

Overlap Rule, Overlap

Associated with each alias level is an overlap rule. An overlap rule takes as input two referenced trees and decides whether those two referenced trees are considered to overlap or considered to not overlap according to this alias level.

The basic idea for using the alias levels to determine whether two memory references may alias is to ask whether the two corresponding referenced trees overlap according to either of the applied alias levels. If neither overlap, the memory references may be considered to not alias.

More specifically, use the following steps to determine the alias relation that is specified by the alias levels:

1. Take a pair of memory references, at least one of which is a dereference.
2. For the first reference, take its applied alias level, and apply the associated overlap rule to the two referenced trees.
3. For the second reference, take its applied alias level, and apply the associated overlap rule to the two referenced trees.
4. If neither rule indicates that the referenced trees overlap, then the compiler is free to assume, without further knowledge or analysis, that the two memory references do not alias.

Notice that:

The alias levels only specify the alias relation when one of the pair of memory references is a dereference. (The alias relation for a pair of direct memory references is a solvable compile-time problem that does not need the assistance of a device like the alias levels.)

When the alias levels indicate that a pair of memory references may alias, the compiler is still free to apply other analytic techniques which may have the result of proving that they in fact do not alias.

When the alias levels indicate that a pair of memory references do not alias, but the program logic is such that they do in fact reference the same bit or bits, then the compiler will make an incorrect assumption and incorrect code may be compiled. This situation is an error in the use of the alias levels. (There is more discussion of this error below.)

Alias Levels

The following table lists the names of the seven alias levels, and specifies for each level the associated overlap rule and any associated restrictions which the level imposes in accordance with an embodiment of the present invention.

Any

Overlap Rule

The two referenced trees overlap.

Associated Restrictions

None.

Basic

Overlap Rule 1. (char exception): If either accessed type is a character type and the originating memory reference of the character type is a dereference, the two referenced trees overlap.

2. (non-scalars overlap): The two referenced trees overlap unless both of the accessed types are one of:
   a basic type,
   an enum type, or
   a pointer type.

3. (mark unions): For all marked nodes that are a descendant of a union field, assure that all of the nodes of all of the other union fields are marked.

4. (match): Take one of the resulting referenced trees and extract the subtree that is just the accessed type, or if it is a bit field reference, extract the struct or union subtree whose child is the accessed type. Using basic match, check for an overlapping match between this extracted subtree and the other referenced tree. Repeat this process reversing the two referenced trees. If either check found an overlapping match, the two referenced trees overlap, otherwise they do not overlap.

Notice that this rule ignores context by using the accessed type to check for a match, not the referenced type. The fact that the parent struct or union subtree is used for bit field references means that the bit field width is matched.

Associated Restrictions
    None.
Weak
Overlap Rule 1. (char exception): If either accessed type is a character type and the originating memory reference of the character type is a dereference, the two referenced trees overlap.

2. (apply basic): If the two referenced trees do not overlap according to the overlap rule of basic, then they do not overlap.

3. (mark unions): For all marked nodes that are a descendant of a union field, assure that all of the nodes of all of the other union fields are marked.

4. (match): Using weak match, the two referenced trees overlap if and only if there is an overlapping match between the trees.

Associated Restrictions
    Declarations for all of the struct or union types that either contain the referenced type or that contain a struct or union contained in the referenced type, and that are used as the referenced type of a memory reference in this translation unit, must be visible at the point of the dereference.
Layout
Overlap Rule 1. (char exception): If either accessed type is a character type and the originating memory reference of the character type is a dereference, the two referenced trees overlap.

2. (mark unions): For all marked nodes that are a descendant of a union field, use layout match to consider the common initial portion of that union field with respect to all of the union fields. If the marked node is a descendant of the common initial portion of the ancestor union field, then assure a mark on all of the nodes that are the corresponding descendants of the other union fields.

3. (straight match): Using layout match, if there is an overlapping match between the two trees, the two referenced trees overlap.

4. (common initial portion match): Using layout match, consider the common initial portion of the two referenced trees. If there is such a common initial portion, and if there is an overlapping match between any two corresponding members of the two common initial portions, the two referenced trees overlap.

5. (otherwise): The two referenced trees do not overlap.
Associated Restrictions
    None.
Strict
Overlap Rule 1. (char exception): If either accessed type is a character type and the originating memory reference of the character type is a dereference, the two referenced trees overlap.

2. (mark unions): For all marked nodes that are a descendant of a union field, assure that all of the nodes of all of the other union fields are marked.

3. (match): Using strict match, the two referenced trees overlap if and only if there is an overlapping match between them.

Associated Restrictions
    Declarations for all of the struct or union types that either contain the referenced type or that contain a struct or union contained in the referenced type, and that are used as the referenced type of a memory reference in this translation unit, must be visible at the point of the dereference.
std
Overlap Rule 1. (char exception): If either accessed type is a character type and the originating memory reference of the character type is a dereference, the two referenced trees overlap.

2. (mark unions): For all marked nodes that are a descendant of a union field, use std match to consider the common initial portion of that union field with respect to all of the union fields. If the marked node is a descendant of the common initial portion of the ancestor union field, then assure a mark on all of the nodes that are the corresponding descendants of the other union fields.

3. (match): Using std match, the two referenced trees overlap if and only if there is an overlapping match between them.

Associated Restrictions
    None.
Strong
Overlap Rule 1. (mark unions): For all marked nodes that are a descendant of a union field, use strong match to consider the common initial portion of that union field with respect to all of the union fields. If the marked node is a descendant of the common initial portion of the ancestor union field, then assure a mark on all of the nodes that are the corresponding descendants, of the other union fields.

2. (match): Using strong match, the two referenced trees overlap if and only if there is an overlapping match between them with the property that the two root nodes correspond.

Associated Restrictions
    None.
Flags and Pragmas

The flag (alias_level) specifies which one of these alias levels applies in general to each translation unit. Then a new pragma (alias_level) may be employed to override this flag and specify which alias level applies to the individual types and the individual pointer variables in the translation unit.

In addition, for cases where even more detail is beneficial, there are some new pragmas that let the user override whatever alias levels are in effect and explicitly specify the aliasing relationships between individual types or pointer variables in the translation unit. These pragmas can provide a lot of benefit for the case where most of the pointer usage in a translation unit is covered by one of the available alias levels, but a few specific pointer variables are used in an irregular way not covered by one of the available levels.

There is one flag and several pragmas associated with one embodiment of the present invention.

The flag is as follows: alias_level= any|basic|weak|layout|strict|std|strong

This flag places the indicated alias level into effect for the whole translation unit, i.e. this alias level will be applied to all of the memory references in the translation unit (but see the alias_level pragma for a way in which this application can be overridden).

The first default of the flag is alias_level=basic. The second default of the flag is alias_level=layout.

Some terms used in the pragma definitions are as follows:

| | | |
|---|---|---|
| <level> | which can be any of the alias levels. | |
| <type> | which can be any of the following: | |
| | typedef name | The name of a defined type from a typedef declaration. |
| | struct tag | The keyword struct followed by a struct tag name. |
| | union tag | The keyword union followed by a union tag name. |
| | enum tag | The keyword enum followed by an enum tag name. |
| | basic C type | One of: char, signed char, unsigned char, short, unsigned short, int, unsigned int, long, unsigned long, long long, unsigned long, long, float, double, or long double. |
| | void | Which denotes all pointer types. |
| <pointer> | which can be the name of any variable of pointer type in the translation unit. | |

All of the following pragmas require:
- the named type or variable to be declared prior to the pragma, and
- the pragma to occur prior to the first memory reference to which its meaning applies.

There is one new pragma (with two forms) that permits finer control of which alias levels are applied to the memory references of the translation unit, namely:

pragma alias_level <level> (<type> [, <type>] . . . )

This pragma specifies that the indicated alias level applies to all of the memory references of the translation unit where the referenced tree of the dereference is the same as the tree for any of the named types.

pragma alias_level <level> (<pointer> [, <pointer>] . . . )

This pragma specifies that the indicated alias level applies to all of the dereferences of the translation unit where any of the named pointer variables is being dereferenced.

When more than one alias level is specified as being applied to a particular dereference, the level applied via the pointer name, if any, has precedence over any other level, and then the level applied via the type name, if any, has precedence over the level applied via the flag.

One embodiment of the present invention provides six new pragmas that permit the user finer control over the user-specified assumptions. These pragmas are useful for the case where most of the pointer usage in a translation unit is covered by one of the available alias levels, but a few specific types or pointer variables are used in an irregular way not covered by one of the available levels. These pragmas are as follows:

pragma alias (<type> [, <type>] . . . )

Roughly speaking, this pragma specifies that the listed types are to be universally regarded as aliasing each other. More specifically, this pragma has the following effect:

Take each possible (non-ordered) pair of the listed types.
Add each of these pairs to the forced match relation.
Delete each of these pairs from the forced non-match relation if they are in the relation.
Note that the forced match and forced non-match relations are used in the match algorithms.

pragma alias (<pointer>, <pointer> [, <pointer>] . . . )

This pragma specifies that at the point of any dereference of any of the named pointer variables, the pointer value being dereferenced may be pointing to the same object as any of the other named pointer variables. The effect of this pragma overrides the aliasing effect of any applied alias levels.

pragma may_point_to (<pointer>, <variable> [, <variable>] . . . )

This pragma specifies that at the point of any dereference of the named pointer variable, the pointer value being dereferenced may be pointing to the objects contained in any of the named variables. The effect of this pragma overrides the aliasing effect of any applied alias levels.

pragma noalias (<type>, <type> [, <type>] . . . )

Roughly speaking, this pragma specifies that the listed types are to be universally regarded as not aliasing each other. More specifically, this pragma has the following effect:

Take each possible (non-ordered) pair of the listed types.
Add each of these pairs to the forced non-match relation.
Delete each of these pairs from the forced match relation if they are in the relation.
Note that the forced match and forced non-match relations are used in the match algorithms.

pragma noalias (<pointer>, <pointer> [, <pointer>] . . . )

This pragma specifies that at the point of any dereference of any of the named pointer variables, the pointer value being dereferenced will not be pointing to the same object as any of the other named pointer variables. The effect of this pragma overrides the aliasing effect of any applied alias levels.

pragma may_not_point_to (<pointer>, <variable> [, <variable>] . . . )

This pragma specifies that at the point of any dereference of the named pointer variable, the pointer value being dereferenced will not be pointing to the objects contained in any of the named variables. The effect of this pragma overrides the aliasing effect of any applied alias levels.

Method for Performing Offset-based Disambiguation

The following section presents a method for performing offset-based disambiguation in accordance with an embodiment of the present invention. This method works with the levels "weak" and "strict" that are defined above.

A number of terms are used in describing this method.

Root Tree—In a tree representation, the "top-level" tree is a root tree.
Sub-trees—In a tree representation, any nodes with children, that are not the root tree, are sub-trees. (i.e. embedded structures)
Defined Types—All types defined in the compilation unit.
Defined Trees—All of the trees of the defined types.

Offset Range—The start and end offset of a type in a derived type. An offset range may be marked or unmarked for identification later. An offset range is relative to a Root Tree of a Sub-Tree.

Aliases Range List—A list of offset ranges that alias.

Method

The method starts with the referenced type tree, with the access type marked, in two references to evaluate: R1 and R2.

1. Traverse all of the defined trees by their leaf nodes.
For every leaf,
compute the offset range relative to the root tree and all sub-trees.
2. Compute the offset range for R1 and R2 relative to the root tree, and add the smallest offset range unmarked to the Aliases Range List.
3. Traverse all of the defined trees by their leaf nodes until no more additions are made to the Aliases Range List.
For every leaf, if any of the leafs offest ranges are in the Aliases Range List urtnarked,
For all the leafs offset ranges
If the leaf s offset range is relative to a Sub-Trees, AND if the offset range is not in the Aliases Range List, add a marked offset range entry into the Aliases Range List.
If the leafs offset range is relative to a Root-Tree, add an unmarked offset range entry into the Aliases Range List, possibly replacing a marked entry.
4. If the Alias Range List contains the Offset Range relative to the root tree or R1 and R2, accesses may alias. Otherwise, they do not alias.
5. If accesses may alias, but their basic types do not match, then they do not alias.

EXAMPLE G

```
struct arsenic {              struct gangrene {
    int a1;                       int g1;
    int a2;                       int g2;
    struct lead {
        int L1;                   int g3;
                                  struct botulism {
        int L2;                       int B1;
    } L;
    int a5;                           int B2;
                                  } B
} *ap;                        } *gp;
```

Do references ap->a1 and gp->g2 alias?

Step 1: Compute offset ranges. Denote marks by enclosing in parentheses.

```
struct, tag = arsenic
    a1: (int), range = 0,3
    a2: int, range = 4,7
    L: struct, tag = lead
        L1: int, range = 8,11;0,3
        L2: int, range = 12,15;4,7
    a5: int, range = 16,19
struct, tag = gangrene
    g1: int, range = 0,3
    g2: (int), range = 4,7
    g3: int, range 8,11
    B: struct, tag = botulism
        B1: int, range = 12,15;0,3
```

-continued

```
        B2; int, range = 16,19;4,7
```

Step 2: Compute offset range of R1 and R2 and add to Alias Range List.

Alias Range List: 0,3

Step 3:

Iteration 1:

First new match is L1: int, range=8,11;0,3.

Add 8,11 to Alias Range List unmarked because 8,11 is relative to Root Tree; no need to add 0,3.

Second new match is B1: int, range=12,15;0,3.

Add 12,15 to Alias Range List unmarked, no need to add 0,3.

Alias Range List: 0,3;8,11;12,15

Iteration 2:

First new match is L2: int, range 12,15;4,7

Add 4,7 to Alias Range List marked because 4,7 is relative to a Sub-Tree; no need to add 12,15.

Alias Range List: 0,3;8,11;12,15; (4,7)

Iteration 3:

No new matches.

0,3 and 4,7 are both in the Alias Range List, References may alias!

Example H

Do references ap->a5 and gp->g1 alias?

Step 1: Compute offset ranges.

```
struct, tag = arsenic
    a1: int, range = 0,3
    a2: int, range = 4,7
    L: struct, tag = lead
        L1: int, range = 8,11;0,3
        L2: int, range = 12,15;4,7
    a5: (int), range = 16,19
struct, tag = gangrene
    g1: (int), range = 0,3
    g2: int, range = 4,7
    g3: int, range 8,11
    B: struct, tag = botulism
        B1: int, range = 12,15;0,3
        B2; int, range = 16,19;4,7
```

Step 2: Compute offset range of R1 and R2 and add to Alias Range List.

Alias Range List: 0,3

Step 3:

Iteration 1:

First new match is L1: int, range 8,11;0,3

Add 8,11 to Alias Range List unmarked because 8,11 is relative to a Root Tree

Second new match is B1: int, range=12,15;0,3

Add 12,15 to Alias Range List unmarked.

Alias Range List: 0,3;8,11;12,15

Iteration 2:

No new matches.

16,19 and 0,3 are not both the Alias Range List, References do not alias!

Example I

```
struct arsenic {                struct gangrene {
    int a1;                         int g1;
    struct radon {
        int r1;                     int g2;
        struct lead {
            int L1;                 int g3;
                                    struct botulism {
            int L2;                     int B1;
        } L;
    } r;
    int a5;                         int B2;
                                } B;
} *ap;                          } *gp;
```

Do references ap->r.L.L2 and gp->g3 alias?

Step 1: Compute offset ranges.

```
struct, tag = arsenic
    a1: int, range = 0,3
    r: struct, tag = radon
        r1: int, range = 4,7;0,3
        L: struct, tag = lead
            L1: int, range = 8,11;4,7;0,3
            L2: (int), range = 12,15;8,11;4,7
    a5: int, range = 16,19
struct, tag = radon
    r1: int, range = 0,3
    struct, tag = lead
        L1: int, range = 4,7;0,3
        L2: int, range = 8,11;4,7
struct, tag = gangrene
    g1: int, range = 0,3
    g2: int, range = 4,7
    g3: (int), range = 8,11
    B: struct, tag = botulism
        B1: int, range = 12,15;0,3
        B2: int, range = 16,19;4,7
```

Step 2: Compute offset range for R1 and R2 and add to Alias Range List.

Alias Range List: 8,11

Step 3:

Iteration 1:

First new match is L1: int, range=8,11;4,7;0,3

Add 0,3 and 4,7 marked into Alias Range List.

Alias Range List: 8,11; (4,7);(0,3)

Second new match is L2: (int), range=12,15;8,11;4,7

Add 12,15 unmarked into Alias Range List.

Alias Range List: 8,11; (4,7);(0,3);12,15

Iteration 2:

No new matches found.

Step 4:

Check if 8,11 and 12,15 are in the Alias Range List.

Yes! references may alias.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. Additionally, the above disclosure is not intended to limit the invention. The scope of the invention is defined by the appended claims.

What is claimed is:

1. A method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other wherein the disarnbiluation technique operates by presuming that a first memory reference and a second memory reference alias if there is an overlapping match between a first type tree for the first memory reference and a second type tree for the second memory reference.

2. The method of claim 1, further comprising prior to using the selected disambiguation technique to identify the memory references:

receiving the code in source code form; and processing the code into an intermediate form.

3. The method of claim 1, further comprising optimizing the code based upon the identified memory references that alias with each other to produce executable code.

4. The method of claim 1, further comprising allowing the programmer to identify the set of constraints adhered to for each variable in the code.

5. The method of claim 1, wherein the disambiguation technique operates by presuming any two memory references alias.

6. The method of claim 1, wherein within the overlapping match, a root node of the first type tree corresponds to a root node of the second type tree.

7. The method of claim 1, wherein determining if there is an overlapping match involves ensuring that for marked nodes in a type tree that are descendants of a union field, corresponding nodes for associated union fields are marked.

8. The method of claim 7, wherein the corresponding nodes for associated union fields are determined by considering a common initial portion of the union field with respect to other union fields.

9. The method of claim 1, further comprising indicating an error condition if pointers of different structure types are cast to each other.

10. The method of claim 1, wherein the disambiguation technique operates by using a tree-based matching scheme for alias analysis.

11. The method of claim 1, wherein the disambiguation technique operates by using a de-referenced type and an accessed type in a type-based alias analysis.

12. The method of claim 1, wherein if a first memory reference is associated with a first disambiguation technique and a second memory reference is associated with a second disambiguation technique, the method uses both the first disambiguation technique and the second disambiguation technique to determine whether the first memory reference and the second memory reference alias.

13. A computer-readable storage medium storing instructions that when executed by a computer cause the computer to perform a method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming that a first memory reference and a second memory reference alias if either reference is to a character type and an originating reference for the character type is a de-reference.

14. The computer-readable storage medium of claim 13, wherein the method further comprises prior to using the selected disambiguation technique to identify the memory references:

receiving the code in source code form; and processing the code into an intermediate form.

15. The computer-readable storage medium of claim 13, wherein the method further comprises optimizing the code based upon the identified memory references that alias with each other to produce executable code.

16. The computer-readable storage medium of claim 13, wherein the method further comprises allowing the programmer to identify the set of constraints adhered to for each variable in the code.

17. The computer-readable storage medium of claim 13, wherein the disambiguation technique operates by presuming any two memory references alias.

18. The computer-readable storage medium of claim 13, wherein the method further comprises indicating an error condition if pointers of different structure types are cast to each other.

19. The computer-readable storage medium of claim 13, wherein the disambiguation technique operates by using a tree-based matching scheme for alias analysis.

20. The computer-readable storage medium of claim 13, wherein the disambiguation technique operates by using a de-referenced type and an accessed type in a type-based alias analysis.

21. The computer-readable storage medium of claim 13, wherein if a first memory reference is associated with a first disambiguation technique and a second memory reference is associated with a second disambiguation technique, the method uses both the first disambiguation technique and the second disambiguation technique to determine whether the first memory reference and the second memory reference alias.

22. An apparatus that disambiguates memory references that allows a programmer to specify a set of constraints that the programmer has adhered to in writing code so that a compiler is able to assume the set of constraints in disambiguating memory references within the code, the apparatus comprising:

a receiving mechanism that receives an identifier for the set of constraints on memory references that the programmer has adhered to in writing the code;

a selection mechanism that uses the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and an identification mechanism that uses the selected disambiguation technique to identify memory references within the code that alias with each other;

wherein the disambiguation technique operates by presuming that a first memory reference and a second memory reference alias if either reference is to a character type and an originating reference for the character type is a de-reference.

23. The apparatus of claim 22, further comprising a front end that is configured to, receive the code in source code form; and process the code into an intermediate form.

24. The apparatus of claim 22, further comprising an optimizer that optimizes the code based upon the identified memory references to produce executable code.

25. The apparatus of claim 22, wherein the selection mechanism is configured to allow the programmer to identify the set of constraints adhered to for each variable in the code.

26. The apparatus of claim 22, wherein the disambiguation technique operates by presuming any two memory references alias.

27. The apparatus of claim 22, further comprising an error indicating mechanism that indicates an error condition if pointers of different structure types are cast to each other.

28. The apparatus of claim 22, wherein the disambiguation technique operates by using a tree-based matching scheme for alias analysis.

29. The apparatus of claim 22, wherein the disambiguation technique operates by using a de-referenced type and an accessed type in a type-based alias analysis.

30. The apparatus of claim 22, wherein if a first memory reference is associated with a first disambiguation technique and a second memory reference is associated with a second disambiguation technique, the apparatus uses both the first disambiguation technique and the second disambiguation technique to determine whether the first memory reference and the second memory reference alias.

31. A method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming that a first memory reference and a second memory reference alias if either reference is to a character type and an originating reference for the character type is a de-reference.

32. A method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming any two memory references alias unless they are both one of, a basic type, an enumerated type and a pointer type.

33. A method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming that a first memory reference and a second memory reference alias if there is an overlapping match between common initial portions of a first type tree for the first memory reference and a second type tree for the second memory reference.

34. A method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming that a first memory and a second memory reference alias if:

the first memory reference is directed to a structure element of the same basic type as the second memory reference; and the first memory reference and the second memory reference have the same structure offset.

35. A method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming that a first memory and a second memory reference having the same structure offset alias only if explicit program instructions specify that the first memory reference and the second memory reference alias.

36. A method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming that a first memory into a first structure and a second memory reference into a second structure alias if:

the first structure and the second structure include the same basic types in the same order; and the first memory reference and the second memory reference have the same structure offset.

37. A method for disambiguating memory references that allows a programmer to specify a set of constraints that the programmer has adhered to in writing code so that a compiler is able to assume the set of constraints in disambiguating memory references within the code, the method comprising:
- receiving an identifier for the set of constraints on memory references that the programmer has adhered to in writing the code;
- using the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- using the selected disambiguation technique to identify memory references within the code that alias with each other;
- wherein the disambiguation technique operates by presuming that a first memory and a second memory reference alias if the first memory reference and the second memory reference have the same structure offset.

38. A computer-readable storage medium storing instructions that when executed by a computer cause the computer to perform a method for disambiguating memory references that allows a programmer to specify a set of constraints that the programmer has adhered to in writing code so that a compiler is able to assume the set of constraints in disambiguating memory references within the code, the method comprising:
- receiving an identifier for the set of constraints on memory references that the programmer has adhered to in writing the code;
- using the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- using the selected disambiguation technique to identify memory references within the code that alias with each other;
- wherein the disambiguation technique operates by presuming any two memory references alias unless they are both one of, a basic type, an enumerated type and a pointer type.

39. A computer-readable storage medium storing instructions that when executed by a computer cause the computer to perform a method for disambiguating memory references that allows a programmer to specify a set of constraints that the programmer has adhered to in writing code so that a compiler is able to assume the set of constraints in disambiguating memory references within the code, the method comprising:
- receiving an identifier for the set of constraints on memory references that the programmer has adhered to in writing the code;
- using the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- using the selected disambiguation technique to identify memory references within the code that alias with each other;
- wherein the disambiguation technique operates by presuming that a first memory reference and a second memory reference alias if there is an overlapping match between a first type tree for the first memory reference and a second type tree for the second memory reference.

40. A computer-readable storage medium storing instructions that when executed by a computer cause the computer to perform a method for disambiguating memory references that allows a programmer to specify a set of constraints that the programmer has adhered to in writing code so that a compiler is able to assume the set of constraints in disambiguating memory references within the code, the method comprising:
- receiving an identifier for the set of constraints on memory references that the programmer has adhered to in writing the code;
- using the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- using the selected disambiguation technique to identify memory references within the code that alias with each other;
- wherein the disambiguation technique operates by presuming that a first memory and a second memory reference alias if:
  - the first memory reference is directed to a structure element of the same basic type as the second memory reference; and
  - the first memory reference and the second memory reference have the same structure offset.

41. A computer-readable storage medium storing instructions that when executed by a computer cause the computer to perform a method for disambiguating memory references that allows a programmer to specify a set of constraints that the programmer has adhered to in writing code so that a compiler is able to assume the set of constraints in disambiguating memory references within the code, the method comprising:
- receiving an identifier for the set of constraints on memory references that the programmer has adhered to in writing the code;
- using the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- using the selected disambiguation technique to identify memory references within the code that alias with each other;
- wherein the disambiguation technique operates by presuming that a first memory and a second memory reference having the same structure offset alias only if explicit program instructions specify that the first memory reference and the second memory reference alias.

42. A computer-readable storage medium storing instructions that when executed by a computer cause the computer to perform a method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming that a first memory into a first structure and a second memory reference into a second structure alias if:
  the first structure and the second structure include the same basic types in the same order; and
  the first memory reference and the second memory reference have the same structure offset.

43. A computer-readable storage medium storing instructions that when executed by a computer cause the computer to perform a method for disambiguating memory references that allows a programmer to specify a set of constraints that the programmer has adhered to in writing code so that a compiler is able to assume the set of constraints in disambiguating memory references within the code, the method comprising:

receiving an identifier for the set of constraints on memory references that the programmer has adhered to in writing the code;

using the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and using the selected disambiguation technique to identify memory references within the code that alias with each other;

wherein the disambiguation technique operates by presuming that a first memory and a second memory reference alias if the first memory reference and the second memory reference have the same structure offset.

44. An apparatus that disambiguates memory references that allows a programmer to specify a set of constraints that the programmer has adhered to in writing code so that a compiler is able to assume the set of constraints in disambiguating memory references within the code, the apparatus comprising:

a receiving mechanism that receives an identifier for the set of constraints on memory references that the programmer has adhered to in writing the code;

a selection mechanism that uses the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and an identification mechanism that uses the selected disambiguation technique to identify memory references within the code that alias with each other;

wherein the disambiguation technique operates by presuming any two memory references alias unless they are both one of, a basic type, an enumerated type and a pointer type.

45. An apparatus that disambiguates memory references that allows a programmer to specify a set of constraints that the programmer has adhered to in writing code so that a compiler is able to assume the set of constraints in disambiguating memory references within the code, the apparatus comprising:

a receiving mechanism that receives an identifier for the set of constraints on memory references that the programmer has adhered to in writing the code;

a selection mechanism that uses the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and an identification mechanism that uses the selected disambiguation technique to identify memory references within the code that alias with each other;

wherein the disambiguation technique operates by presuming that a first memory reference and a second memory reference alias if there is an overlapping match between common initial portions of a first type tree for the first memory reference and a second type tree for the second memory reference.

46. An apparatus that disambiguates memory references that allows a programmer to specify a set of constraints that the programmer has adhered to in writing code so that a compiler is able to assume the set of constraints in disambiguating memory references within the code, the apparatus comprising:

a receiving mechanism that receives an identifier for the set of constraints on memory references that the programmer has adhered to in writing the code;

a selection mechanism that uses the identifier to select a disambiguation technique from a set of disambiguation techniques, the disambiguation technique being associated with the set of constraints adhered to by the programmer;

wherein each disambiguation technique in the set of disambiguation techniques is associated with a different set of constraints on memory references; and an identification mechanism that uses the selected disambiguation technique to identify memory references within the code that alias with each other;

wherein the disambiguation technique operates by presuming that a first memory reference and a second memory reference alias if there is an overlapping match between a first type tree for the first memory reference and a second type tree for the second memory reference.

47. An apparatus that disambiguates memory references that allows a programmer to specify a set of constraints that the programmer has adhered to in writing code so that a compiler is able to assume the set of constraints in disambiguating memory references within the code, the apparatus comprising:
- a receiving mechanism that receives an identifier for the set of constraints on memory references that the programmer has adhered to in writing the code;
- a selection mechanism that uses the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- an identification mechanism that uses the selected disambiguation technique to identify memory references within the code that alias with each other;
- wherein the disambiguation technique operates by presuming that a first memory and a second memory reference alias if:
  - the first memory reference is directed to a structure element of the same basic type as the second memory reference; and
  - the first memory reference and the second memory reference have the same structure offset.

48. An apparatus that disambiguates memory references that allows a programmer to specify a set of constraints that the programmer has adhered to in writing code so that a compiler is able to assume the set of constraints in disambiguating memory references within the code, the apparatus comprising:
- a receiving mechanism that receives an identifier for the set of constraints on memory references that the programmer has adhered to in writing the code;
- a selection mechanism that uses the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- an identification mechanism that uses the selected disambiguation technique to identify memory references within the code that alias with each other;
- wherein the disambiguation technique operates by presuming that a first memory and a second memory reference having the same structure offset alias only if explicit program instructions specify that the first memory reference and the second memory reference alias.

49. An apparatus that disambiguates memory references that allows a programmer to specify a set of constraints that the programmer has adhered to in writing code so that a compiler is able to assume the set of constraints in disambiguating memory references within the code, the apparatus comprising:
- a receiving mechanism that receives an identifier for the set of constraints on memory references that the programmer has adhered to in writing the code;
- a selection mechanism that uses the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- an identification mechanism that uses the selected disambiguation technique to identify memory references within the code that alias with each other;
- wherein the disambiguation technique operates by presuming that a first memory into a first structure and a second memory reference into a second structure alias if:
  - the first structure and the second structure include the same basic types in the same order; and
  - the first memory reference and the second memory reference have the same structure offset.

50. An apparatus that disambiguates memory references that allows a programmer to specify a set of constraints that the programmer has adhered to in writing code so that a compiler is able to assume the set of constraints in disambiguating memory references within the code, the apparatus comprising:
- a receiving mechanism that receives an identifier for the set of constraints on memory references that the programmer has adhered to in writing the code;
- a selection mechanism that uses the identifier to select a disambiguation technique from a set of disambiguation techniques, the disambiguation technique being associated with the set of constraints adhered to by the programmer;
- wherein each disambiguation technique in the set of disambiguation techniques is associated with a different set of constraints on memory references; and
- an identification mechanism that uses the selected disambiguation technique to identify memory references within the code that alias with each other;
- wherein the disambiguation technique operates by presuming that a first memory and a second memory reference alias if the first memory reference and the second memory reference have the same structure offset.

* * * * *